United States Patent
Ghasemi et al.

(10) Patent No.: US 12,375,174 B1
(45) Date of Patent: Jul. 29, 2025

(54) NETWORK QUALITY EVALUATION BASED ON NETWORK METRICS

(71) Applicant: FRONTIER COMMUNICATIONS HOLDINGS, LLC, Dallas, TX (US)

(72) Inventors: Arman Ghasemi, Weatogue, CT (US); Milad Mostavi, Dallas, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/752,700

(22) Filed: Jun. 24, 2024

(51) Int. Cl.
*H04B 10/079* (2013.01)

(52) U.S. Cl.
CPC .............................. *H04B 10/0795* (2013.01)

(58) Field of Classification Search
CPC ................................................ H04B 10/0795
See application file for complete search history.

(56) References Cited

U.S. PATENT DOCUMENTS

| | | | | |
|---|---|---|---|---|
| 2010/0074614 A1* | 3/2010 | DeLew | ............... | H04B 10/073 398/17 |
| 2013/0268212 A1* | 10/2013 | Makarov | ............ | H01J 49/0036 702/32 |
| 2022/0216916 A1* | 7/2022 | Compann | .......... | H04B 10/0731 |

* cited by examiner

*Primary Examiner* — Shi K Li
(74) *Attorney, Agent, or Firm* — MARSHALL, GERSTEIN & BORUN LLP

(57) ABSTRACT

Techniques for evaluating performance of a Passive Optical Network (PON), include: obtaining a plurality of network performance metrics for an optical network terminal (ONT) for a customer in the PON, the PON including an optical line terminal (OLT) optically connected to a plurality of optical network terminals (ONTs) via a plurality of optical fibers; analyzing each of the plurality of network performance metrics to assign an individual quality metric to each of the plurality of network performance metrics; analyzing the individual quality metrics assigned to each of the plurality of network performance metrics to determine an overall quality metric for the ONT; and providing an indication of the overall quality metric for the ONT to at least one of a user interface or another computing device.

16 Claims, 11 Drawing Sheets

NETWORK QUALITY EVALUATION BASED ON NETWORK METRICS

FIELD OF THE DISCLOSURE

This disclosure relates generally to passive optical networks, and, more particularly, to systems and methods for evaluating quality of a Passive Optical Network (PON) based on various network performance metrics.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

A PON may provide optical network services to thousands or even millions of customers. However, customers may have different experiences due to discrepancies in network performance. Traditionally, an optical network provider relies on customers' feedback to determine the performance of a PON. However, this traditional approach does not allow an optical network provider to know the performance of the PON before receiving feedback. Consequently, the optical network provider is not able to maintain network performance or fix network performance issues proactively.

Further, monitoring the performance of an optical network presents a significant challenge as the optical network may include many hierarchical levels (e.g., an ONT level, a terminal level, a splitter level, an OLT level, a PON level, and a Broadband Network Gateway (BNG) level) and may serve thousands to millions of customers. Thousands to millions of customers are interconnected with the fiber stream originating from the source through various, potentially complex pathways. Given the considerable complexity and extensive nature of this network, identifying equipment faults and poor performance is challenging and resource intensive.

SUMMARY

The present disclosure provides techniques to evaluate network performance in a timely manner without relying on customers' direct feedback. The present disclosure uses network performance metrics of a PON, and determines the quality of the network performance based on the network performance metrics using a set of rules and machine learning models. Accordingly, the techniques of the present disclosure allow a computing system to determine the quality of the network performance based on objective criteria, instead of customers' subjective experiences. The quality evaluation is thus more consistent than the traditional manner that uses customers' direct feedback. Further, in the event that the quality of the network performance is below a threshold quality, a server of the network may transmit a control signal to automatically reboot a component of the PON. In this way, the system is able to fix potential network performance issues before receiving a customer's direct feedback.

In an embodiment, the techniques described herein relate to a method for evaluating performance of a Passive Optical Network (PON), the method including: obtaining a plurality of network performance metrics for an optical network terminal (ONT) for a customer in the PON, the PON including an optical line terminal (OLT) optically connected to a plurality of optical network terminals (ONTs) via a plurality of optical fibers; analyzing each of the plurality of network performance metrics to assign an individual quality metric to each of the plurality of network performance metrics; analyzing the individual quality metrics assigned to each of the plurality of network performance metrics to determine an overall quality metric for the ONT; and providing an indication of the overall quality metric for the ONT to at least one of a user interface or another computing device.

In another embodiment, the techniques described herein relate to a computing device for evaluating performance of a Passive Optical Network (PON), the computing device including: one or more processors; and a non-transitory computer-readable memory storing instructions thereon that, when executed by the one or more processors, cause the computing device to: obtain a plurality of network performance metrics for an optical network terminal (ONT) for a customer in the PON, the PON including an optical line terminal (OLT) optically connected to a plurality of optical network terminals (ONTs) via a plurality of optical fibers; analyze each of the plurality of network performance metrics to assign an individual quality metric to each of the plurality of network performance metrics; analyze the individual quality metrics assigned to each of the plurality of network performance metrics to determine an overall quality metric for the ONT; and provide an indication of the overall quality metric for the ONT to at least one of a user interface or another computing device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
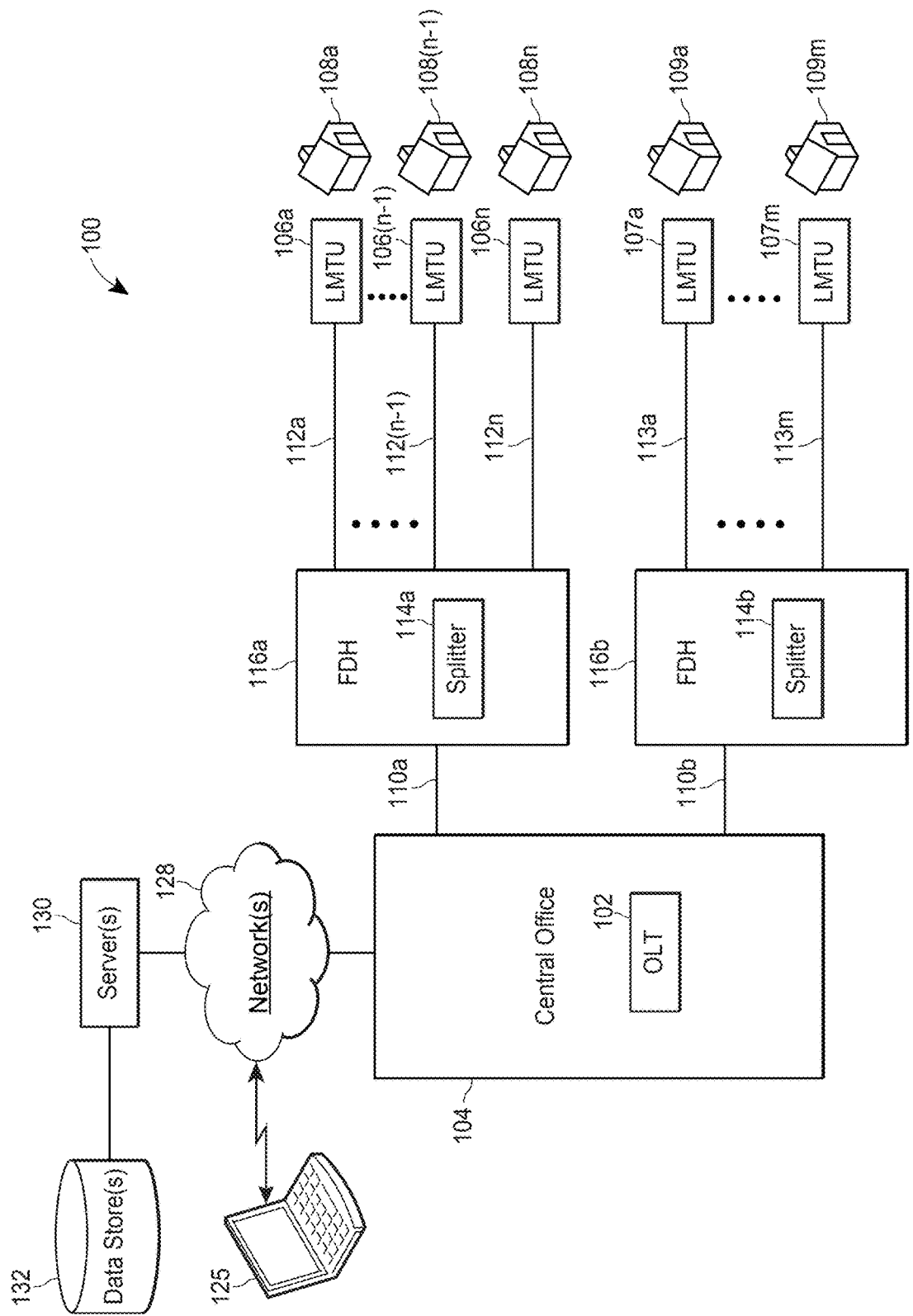
FIG. 1 is a block diagram of an example PON in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for evaluating network performance metrics in a PON.

Reference will now be made in detail to non-limiting examples, some of which are illustrated in the accompanying drawings.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units (LMTU) 106a, . . . , 106n at respective customer premises 108a, . . . , 108n. The last mile termination units 106a, . . . , 106n may be located outside and/or inside the customer premises or locations 108a, . . . , 108n. Each LMTU 106a, . . . , 106n may be, for example, an optical network unit (ONU) or an optical network terminal (ONT).

In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, . . . , 106n via respective distribution optical fibers 112a, . . . , 112n (which are interchangeably referred to herein as "F2 optical fibers 112a, . . . , 112n" or "secondary optical fibers 112a, . . . , 112n"). In the illustrated example, the first feeder optical fiber 110a is optically coupled to the plurality of last mile termination units 106a, . . . , 106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, . . . , 108n are proximally close to the FDH 116a, and typically each of the customer premises 108a, . . . , 108n and respective last mile termination units 106a, . . . , 106n is disposed at a different optical distance from the FDH 116a. An "optical distance," as generally utilized herein, refers to a distance over which an optical signal travels.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or secondary optical fiber 110b from the OLT 102 that is optically coupled to another plurality of last mile termination units 107a-107m at respective customer premises 109a-109m via another many-to-one optical splitter 114b included in another fiber distribution hub 116b and via respective secondary optical fibers 113a-113m.

As utilized herein, the "components" of the PON 100 generally refer to the devices, nodes, and optical fibers of the PON 100. For example, the components of the PON 100 shown in FIG. 1 may include the OLT 102, the FDHs 116a, 116b, the splitters 114a, 114b, the LMTUs 106a-106n and 107a-107m, and the optical fibers interconnecting the devices or nodes, e.g., the optical fibers 110a-110b, 112a-112n, and 113a-113m.

In some scenarios, an optical terminal (e.g., the OLT 102 and/or one or more the last mile termination units 106a-106n, 107a-107m) may transmit optical test signals and/or patterns, indication light, and/or other types of measurement signals into an optical fiber in response to control signals received from a computing device. For example, the OLT 102 and/or the one or more LMTUs 106a-106n, 107a-107m may receive control signals from a computing device 125 (e.g., a laptop, a computer, a tablet, a mobile phone, etc.) associated with a service technician or other agent of the PON 100. In some examples, the computing device 125 controls an optical terminal of the PON 100 via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 1).

Additionally and/or alternatively, control signals may be received from one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

More specifically, the server 130 may execute a network performance evaluation application to determine a network quality of an ONT in the PON 100 based on network performance metrics of the ONT. The components of the PON 100 may include optical detectors to detect light level signals at upstream or downstream endpoints of the optical fibers 110a-110b, 112a-112n, and 113a-113m. For example, an LMTU 106a may include an optical detector to detect the light levels of optical signals at a downstream endpoint of the optical fiber 112a. The FDH 116a may include optical detectors to detect the light levels of optical signals at upstream endpoints of the optical fibers 112a-112n. As utilized herein, the term "upstream" refers to a direction towards the central office 104, and the term "downstream" refers to a direction away from the central office 104.

The server 130 may use the optical fiber detector to collect other network performance metrics. For example, if the server 130 is not able to detect any light signal for a certain time period, the server 130 may determine that there is a stop session occurring. The server 130 may determine the duration of the stop session, and how many stop sessions have occurred during a certain time period for a particular ONT.

Additionally, when the server 130 generates alerts and alarms, the server 130 may record the duration of the alarms and the number of alarms during a certain time for a particular ONT.

In some implementations, when the overall network quality metric of the ONT is below a threshold overall quality, the server 130 or the computing device 125 may transmit a control signal to a component of the PON 100 (e.g., an LMTU 106a, an FDH 116a, etc.) to for example, automatically reboot or reset the component of the PON 100. In some implementations, the server 130 or computing device 125 may transmit a control signal to the component to automatically reboot or reset a light source within the component that emits optical signals. In this manner, the PON 100 may automatically respond to a malfunction without human intervention.

Various information and data associated with, utilized by, and/or generated by the PON 100 may be stored in the data stores 132 of the PON 100. For example, the data store(s) 132 may store records of customer contact events with a technical support organization supporting the PON 100, service call records, records of operating conditions and events which occurred, logbooks, and the like. Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the PON 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

The example servers 130, optical terminals (e.g., any of the OLT 102, the last mile termination units 106a, 106n), and/or the example computing system 125 may include a processing platform capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform may be, for example, one or more servers, a cloud computing system, a computer, a workstation, a laptop, a mobile device (e.g., a cell phone, a smart phone, a tablet such as an iPad™), or any other type of computing device or system.

The example processing platform includes one or more processors, one or more memories, one or more network interfaces, one or more input/output (I/O) interfaces, and/or a set of data stores, all of which are interconnected via one or more address/data bus or communication links.

The processors may be implemented using hardware, and may include a semiconductor based (e.g., silicon-based) device. The processors may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors may be a field programmable gate array (FPGA), an application specific integrated circuit (ASIC), etc. that implements operations of the example methods described herein without executing instructions.

The memories are accessible by the processors (e.g., via a memory controller). The example processors interact with the memories to obtain, for example, machine-readable instructions stored in the memories corresponding to, for example, the operations represented by the flowcharts of this disclosure. The example processors may also interact with the memories to store data, such as data formed or used during execution of machine-readable instructions. Example memories include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform to provide access to the machine-readable instructions stored thereon.

The example processing platform includes one or more communication interfaces such as, for example, the one or more network interfaces, and/or the one or more input/output (I/O) interfaces. The communication interface(s) enable the processing platform to communicate with, for example, another device, system, etc. (e.g., the OLT 102, the last mile termination units 106a, 106n, the one or more servers 130, the computing device 125, the one or more data stores 132, etc., any other database, and/or any other machine).

The example processing platform includes the network interface(s) to enable communication with other machines (e.g., the OLT 102, the last mile termination units 106a, 106n, the one or more servers 130, the computing device 125, etc.) via, for example, one or more networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform includes the input/output (I/O) interface(s) (e.g., a Bluetooth® interface, a near-field communication (NFC) interface, a universal serial bus (USB) interface, a serial interface, an infrared interface, a PCI express interface, etc.) to enable the processors to communicate with peripheral I/O devices and/or other communication systems. For example, the I/O interface(s) may be used to control a light source, enable receipt of user input (e.g., from a touch screen, a keyboard, a navigation device such as mouse, touch pad, joystick or trackball, a microphone, a button, etc.) and communicate output data (e.g., visual indicators, instructions, data, images, etc.) to the user (e.g., via a display, a speaker, a printer, a communication interface, an antenna, etc.). The I/O interface(s) typically include a graphics driver card, graphics driver chip and/or graphics driver processor to drive a display when a display is present.

In some examples, the processing platform also includes, or is otherwise communicatively coupled to, a set of data stores or other data storage mechanisms (one or more of a HDD, optical storage drive, solid state storage device, CD, CD-ROM, DVD, Blu-ray disk, RAID, data storage bank, etc.). The set of data stores may include the example data stores 132.

Individual Metric Evaluation

Various network metrics have been collected for analysis. The analysis is based on clustering analysis and domain expertise. Based on the analysis, an optic light level, a number of PON alarms, a PON alarm duration, a total session duration, and a number of total session stops have been identified as influential individual network metrics for determining a network quality. Detailed analysis of each individual network metric is discussed below.

Figure 2A:
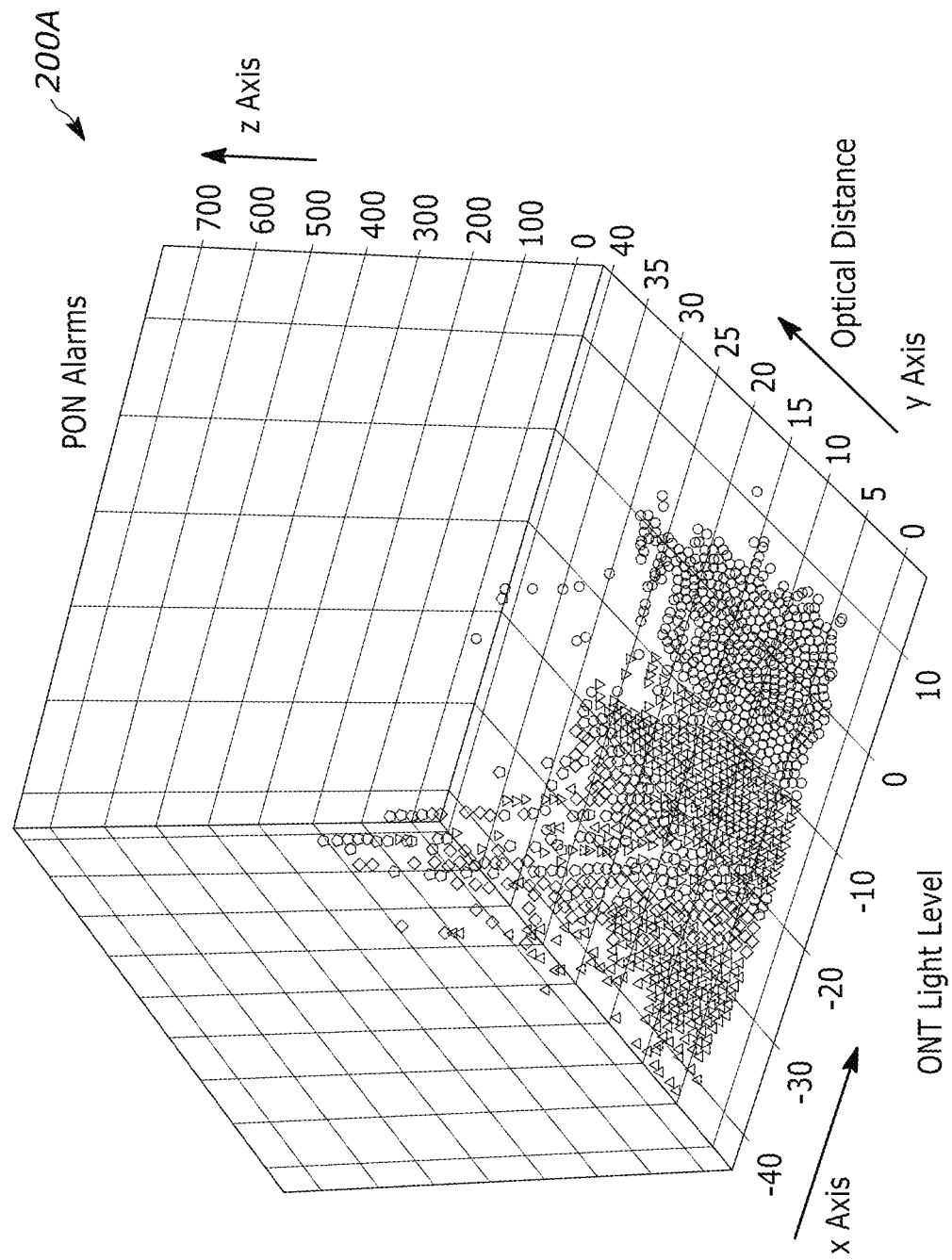
FIG. 2A is an example graph indicating PON alarms as a function of an ONT light level and an optical distance.

FIG. 2A is an example graph 200A indicating PON alarms as a function of an ONT light level and an optical distance.

The x axis of the graph 200A indicates an ONT light level. The ONT light level of x axis may represent a light level of optical signals received at an LMTU (such as one of the LMTUs 106a, . . . , 106n). Light levels of optical signals received at an LMTU may be the same or different at different time points. Light levels of optical of optical signals received at different LMTUs may be the same or different. Accordingly, data points representing different light levels may be based on data collected from the same or different LMTUs. Similarly, data points representing different light levels may be based on data collected from the same or different LMTUs.

The y axis of the graph 200A indicates an optical distance. As indicated above, customer premises (such as the customer premises 108a, . . . , 108n) and respective LMTUs (such as the LMTUs 106a, . . . , 106n) are usually disposed at different optical distances from a respective FDH (such as the FDH 116a). However, in some scenarios, some LMTUs may be at the same optical distance from their respective FDHs. The optical distance of y axis may represent a distance between an LMTU and a respective FDH. Data points representing different optical distances are based on data collected from different LMTUs. In contrast, data points representing the same optical distance may be based on data collected from the same or different LMTUs.

The z axis of the graph 200A indicates a PON alarm duration. Each data point in the graph 200A represents an instance of a PON alarm. Data points representing different alarm durations may be based on data collected from the same or different LMTUs. Similarly, data points representing different alarm durations may be based on data collected from the same or different LMTUs.

Figure 2B:
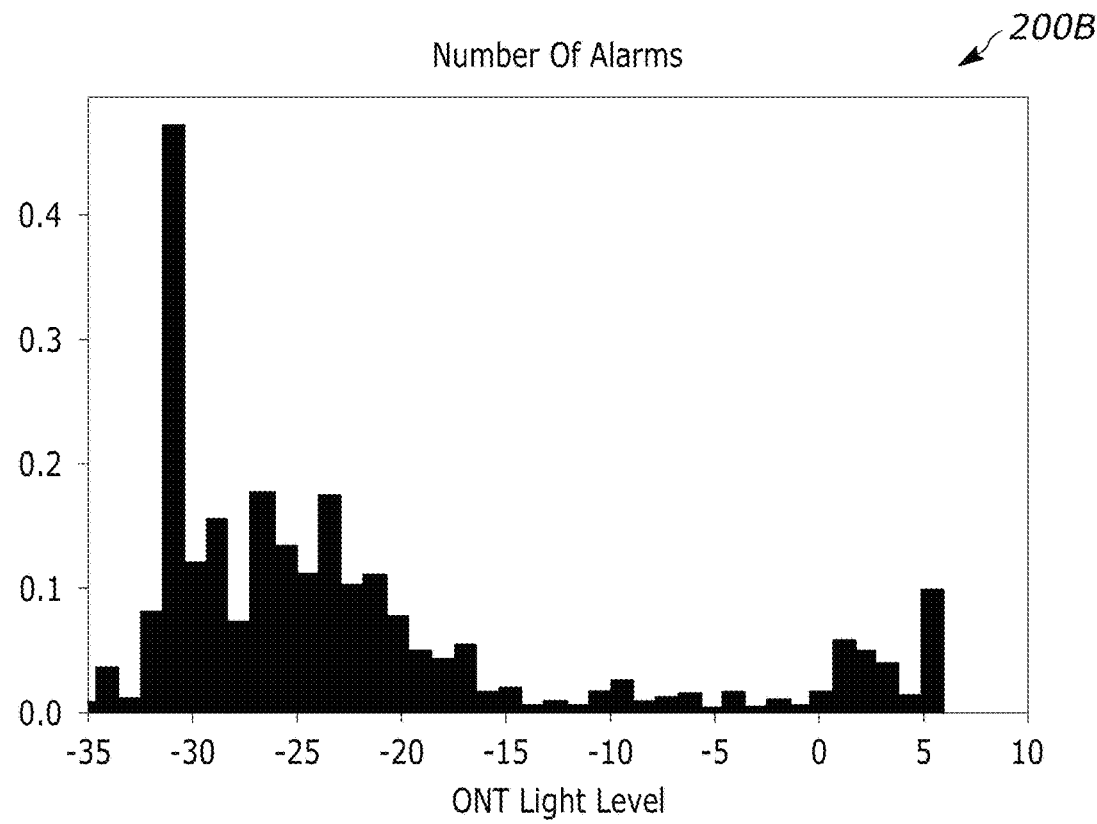
FIG. 2B is an example graph indicating a normalized number of PON alarms as a function of an ONT light level.

FIG. 2B is an example graph 200B indicating a normalized number of PON alarms as a function of an ONT light level. The graph 200B may be obtained by summing up the number of PON alarms corresponding to each PON light level bin in the histogram over the entire range of the optical distance. The summation results are then normalized by dividing by the number of all data points belonging to corresponding PON light level bin.

Figure 2C:
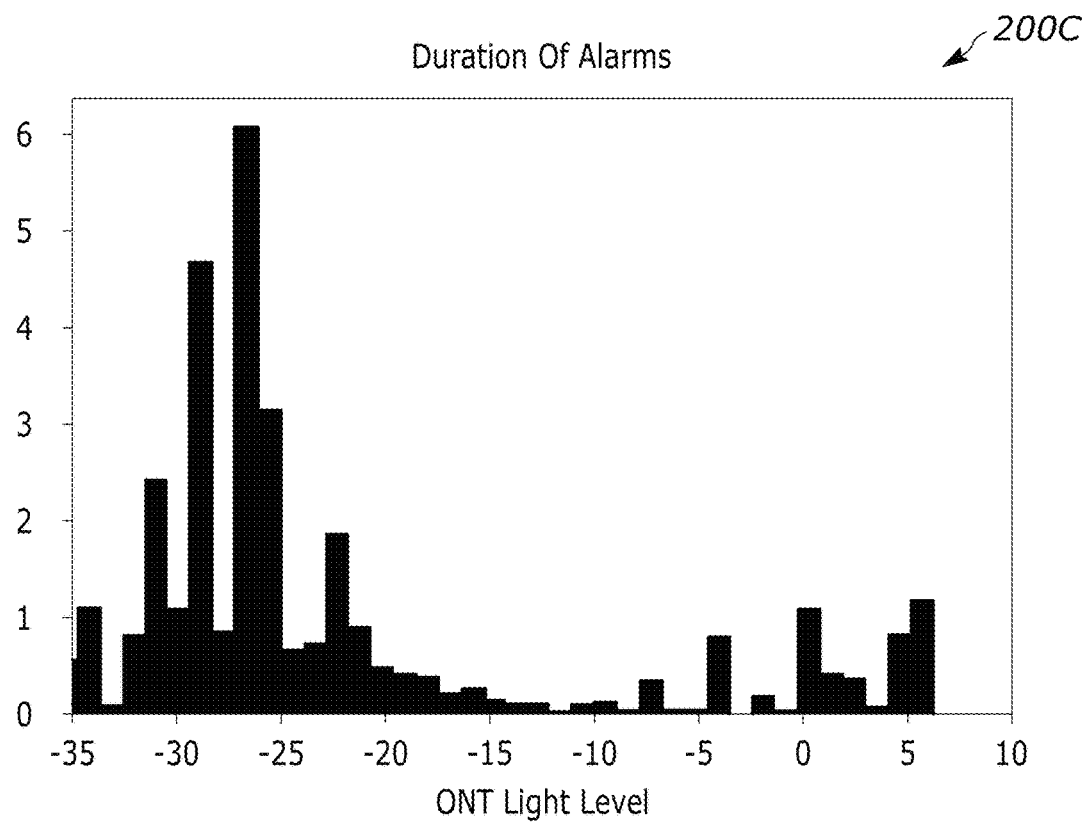
FIG. 2C is an example graph indicating a normalized duration of PON alarms as a function of an ONT light level.

FIG. 2C is an example graph 200C indicating a normalized duration of PON alarms as a function of an ONT light level. The graph 200C may be obtained by summing up the durations of PON alarms corresponding to each PON light level bin in the histogram over the entire range of the optical distance. The summation results are then normalized by dividing by the number of all data points belonging to corresponding PON light level bin.

Figure 3A:
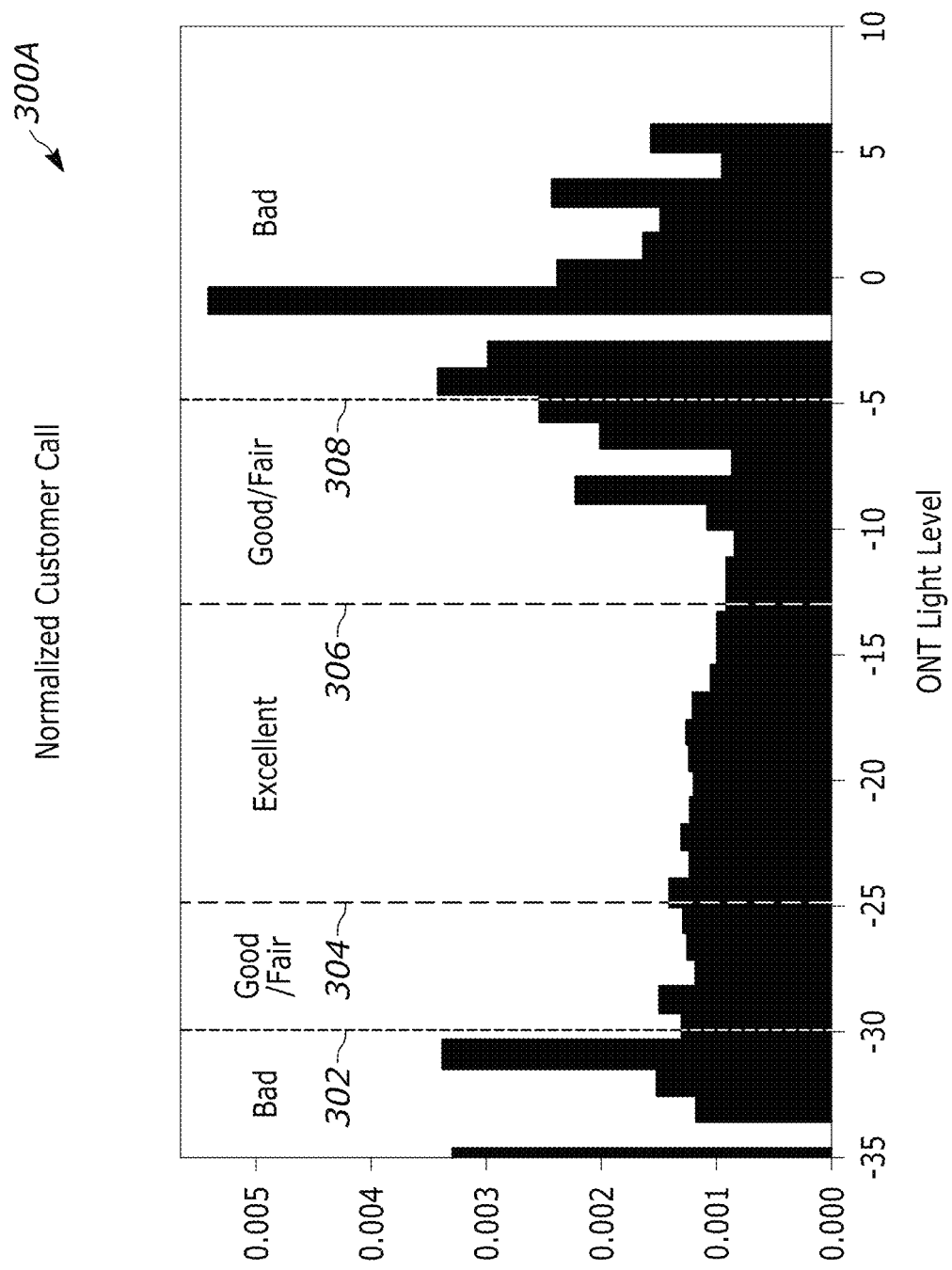
FIG. 3A is an example graph indicating a normalized frequency of customer calls as a function of an ONT light level.

FIG. 3A is an example graph 300A indicating a normalized customer call as a function of an ONT light level. A customer call is a phone call initiated by a customer for technical support. The example graph 300D may be generated based on data collected from a plurality of LTMUs. The horizontal axis represents a light level of LTMUs. The vertical axis represents a normalized number of customer calls.

One may observe that when the ONT light level is greater than −5 (marked by line 308) or lower than −30 (marked by line 302), the normalized number of customer calls is substantially higher than other ranges. Additionally, one may observe that when the ONT light level is between −25 (marked by line 304) and −13 (marked by line 306), the normalized number of customer calls is substantially lower than other ranges. This observation may be used to confirm categorization of individual network metrics, as will be discussed below.

Figure 3B:
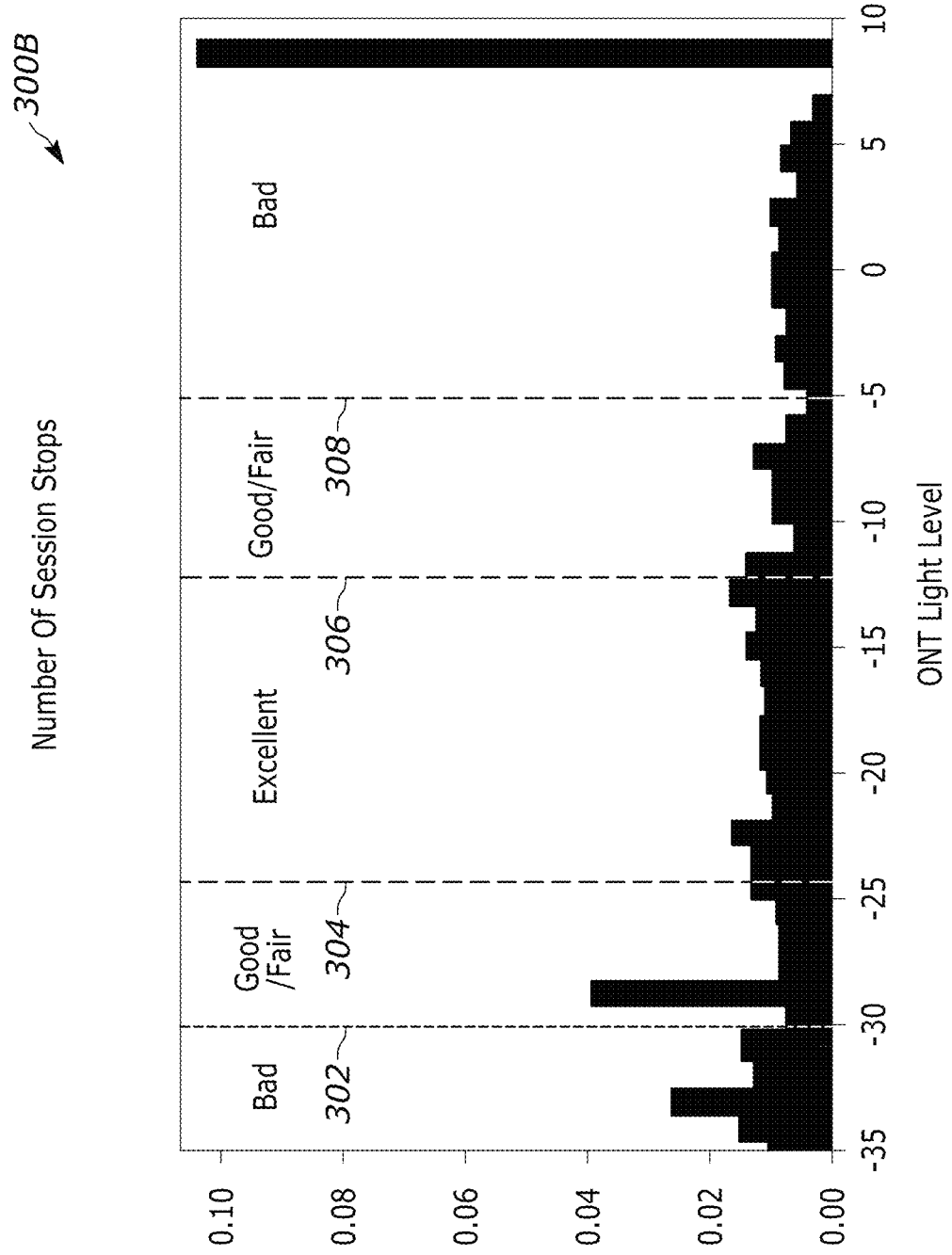
FIG. 3B is an example graph indicating a number of session stops as a function of an ONT light level.

FIG. 3B is an example graph 300B indicating a number of session stops as a function of an ONT light level. The example graph 300B may be generated based on data collected from a plurality of LTMUs. The horizontal axis represents a light level of LTMUs. The vertical axis represents a normalized number of session stops. The lines 312-318 indicate the same light level values as the lines 302-308, respectively.

Figure 3C:
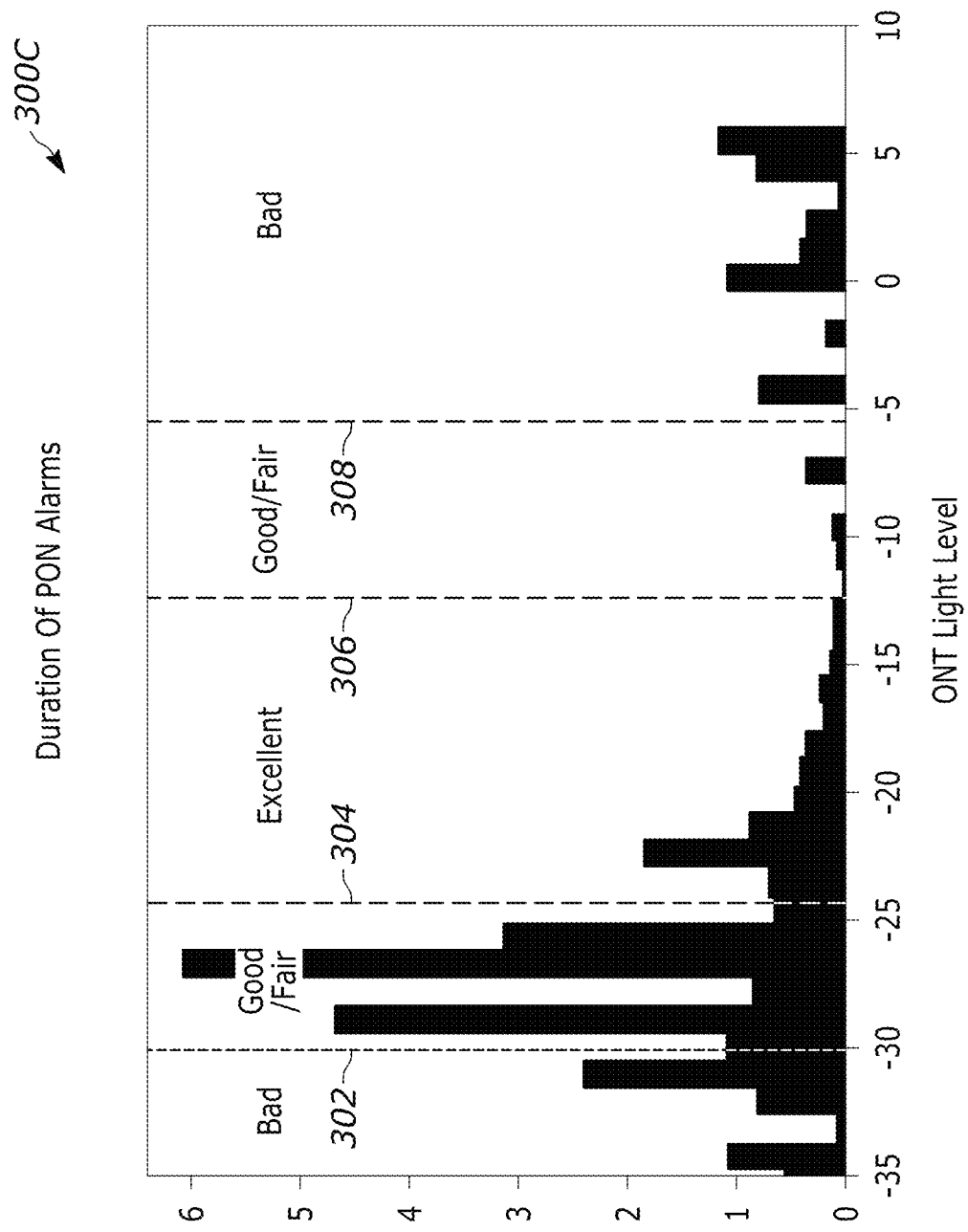
FIG. 3C is an example graph indicating a number of PON alarms as a function of an ONT light level.

FIG. 3C is an example graph 300C indicating a number of PON alarms as a function of an ONT light level. The data shown in graph 300C is identical to the graph 200B.

Figure 3D:
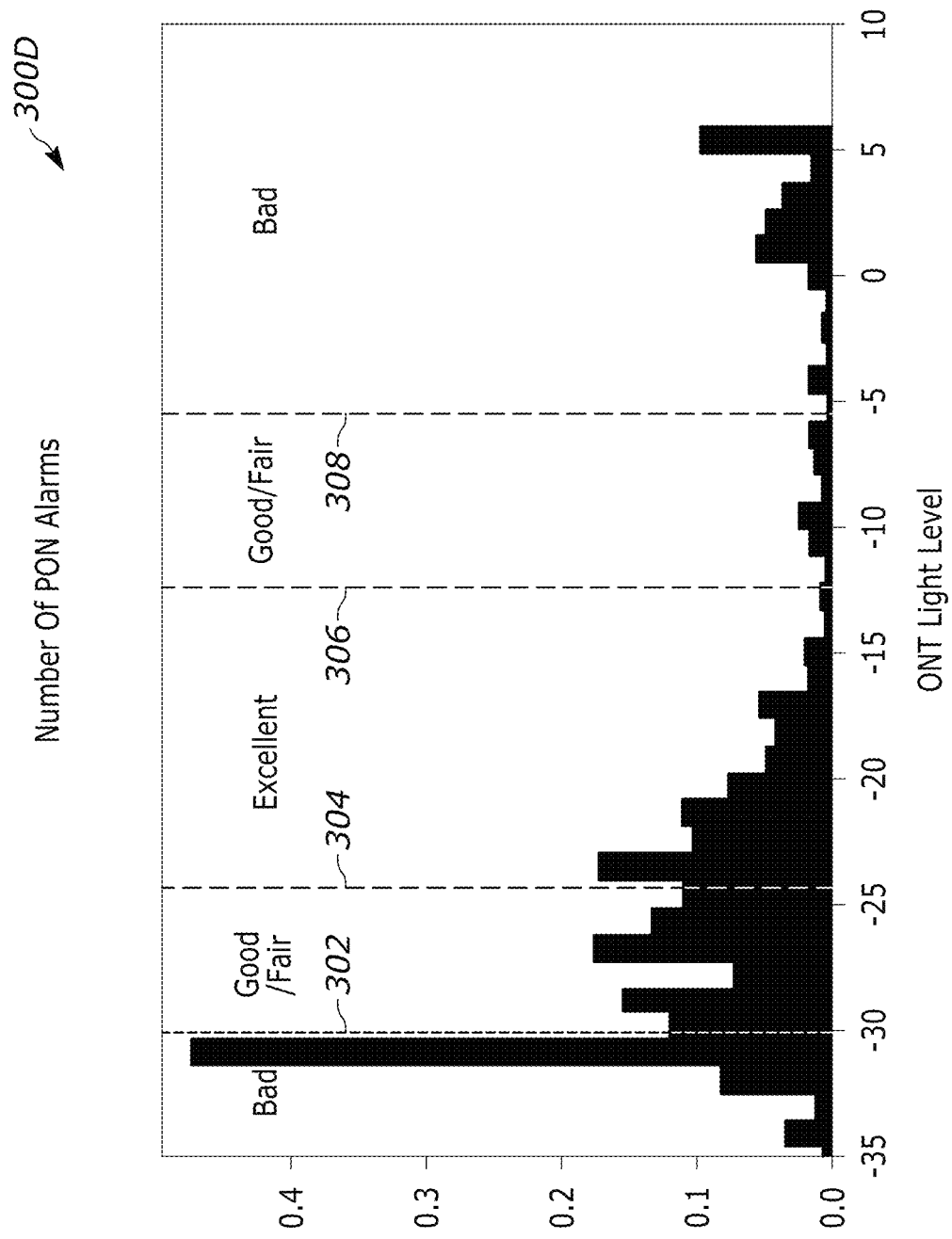
FIG. 3D is an example graph indicating a duration of PON alarms as a function of an ONT light level.

FIG. 3D is an example graph 300D indicating a duration of PON alarms as a function of an ONT light level. The data shown in graph 300D is identical to the graph 200C.

Clustering analysis and bi-modal distribution analysis have been performed on the functions represented by graphs 300B-300D. Based on the analysis, ONT light levels greater than or equal to −25 and less than or equal to −13 (between lines 304 and 306) are categorized as excellent. ONT light levels less than −30 (left side of line 302) or greater than −5 (right side of line 308) are categorized as bad. Categorization of ONT light levels in the other ranges are categorized as good or fair. The categorizations of ONT light levels are confirmed with the observation from graph 300A.

In addition to an optic light level, other individual network metrics such as a number of PON alarms, a total PON alarm duration, a total session duration, and a number of total session stops may be analyzed in a similar manner.

Table 1 below shows a set of rules for assigning individual quality metrics to network performance metrics.

TABLE 1

| Network Performance Metric | Excellent Range | Bad Range | Good or Fair Range |
|---|---|---|---|
| Total Session Time (Seconds) | =86400 | <82800 | >82800 and <86400 |
| Total Alarm Duration (Minutes) | =0 | >60 | >0 and <60 |
| Summation of Session Stops | =0 | | >0 |
| Number of PON Alarms | =0 | | >0 |

As shown in Table 1, the total session time and the total alarm are categorized as excellent, good, fair, or bad, based on their respective metric values. The summation of session stops and the number of PON alarms are categorized as excellent or non-excellent based on their respective metric values.

Overall Quality Evaluation

Based on the evaluation or categorization of the individual network metrics, the server 130 may evaluate an overall quality of a PON.

Table 2 below shows a set of rules for determining an overall performance metric of a PON.

As shown in Table 2, for a PON, if each of the individual network metrics, including a light level, an alarm duration, a session duration, a number of stop sessions, and a number of alarms, is categorized as excellent, the server 130 may determine that the overall network quality is excellent, or assign a numerical value 3 indicating that the overall network quality is excellent. If at least one of the light level, the alarm duration, the session duration is categorized as bad, the server 130 may determine that the overall network quality is bad, or assign a numerical value 0 indicating that the overall network quality is bad.

In other scenarios, that is, none of the rules described above applies to the network metrics, the server 130 may use a machine learning model to evaluate the overall network quality. For example, the server 130 may input the network performance metrics into a machine learning model. The machine learning model may output an indication of the overall quality of the network. The output overall quality of the network may be good or fair, or assign a numerical value 2 or 1 indicating that the overall network quality is good or fair, respectively.

The machine learning model for evaluating overall network quality may be trained with sample individual networks metrics labelled with overall network quality metrics (e.g., network quality scores 1 or 2). More specifically, the individual network metrics may be classified according to their respective overall network quality metric (e.g., a first set of individual network metrics having a first overall network quality metric may be classified into a first group, a second set of individual network metrics having a second overall network quality metric may be classified into a second group, etc.), and the server 130 may analyze the individual network metrics in each group to generate the machine learning model.

The machine learning model may be validated using a different set of sample networks performance metrics labelled with known overall network quality metrics. The known overall network quality metrics may be determined by humans. The machine learning model may be trained using supervised learning techniques. In some embodiments, the machine learning model may be retrained periodically or every time when the system has accumulated a certain amount of new data. In this way, the machine learning model may be adaptable and resilient against drifting and network characteristic changes. In some embodiments, the machine learning model is a random forest model.

Validation of Evaluation System

The network performance evaluation system discussed above may be validated by customer feedback. More specifically, performance of a plurality of PON with known

TABLE 2

| Light Level | Alaram Duration | Session Duration | Number of Stop Sessions | Number of Alarms | Overall Performance Metric |
|---|---|---|---|---|---|
| Excellent | Excellent | Excellent | Excellent | Excellent | 3 |
| Bad | Any Value | Any Value | Any Value | Any Value | 0 |
| Any Value | Bad | Any Value | Any Value | Any Value | 0 |
| Any Value | Any Value | Bad | Any Value | Any Value | 0 |
| Excellent | Good or Fair | Good or Fair | Any Value | Any Value | 1 or 2 |
| Excellent | Excellent | Good or Fair | Any Value | Any Value | Determined by a machine learning model |
| Excellent | Good or Fair | Excellent | Any Value | Any Value | |
| Good or Fair | Excellent | Good or Fair | Any Value | Any Value | |
| Good or Fair | Excellent | Excellent | Any Value | Any Value | |
| Good or Fair | Good or Fair | Excellent | Any Value | Any Value | | customer feedback may be evaluated, without considering the customer feedback, using the network performance evaluation system. After evaluating the performance of the plurality of PON, the evaluated network performance (e.g., indicated by network quality scores 0-3) may be compared with the known customer feedback (e.g., indicated by whether the customer has called, and/or whether an on-site service has been requested), as will be discussed below.

Figure 4B:
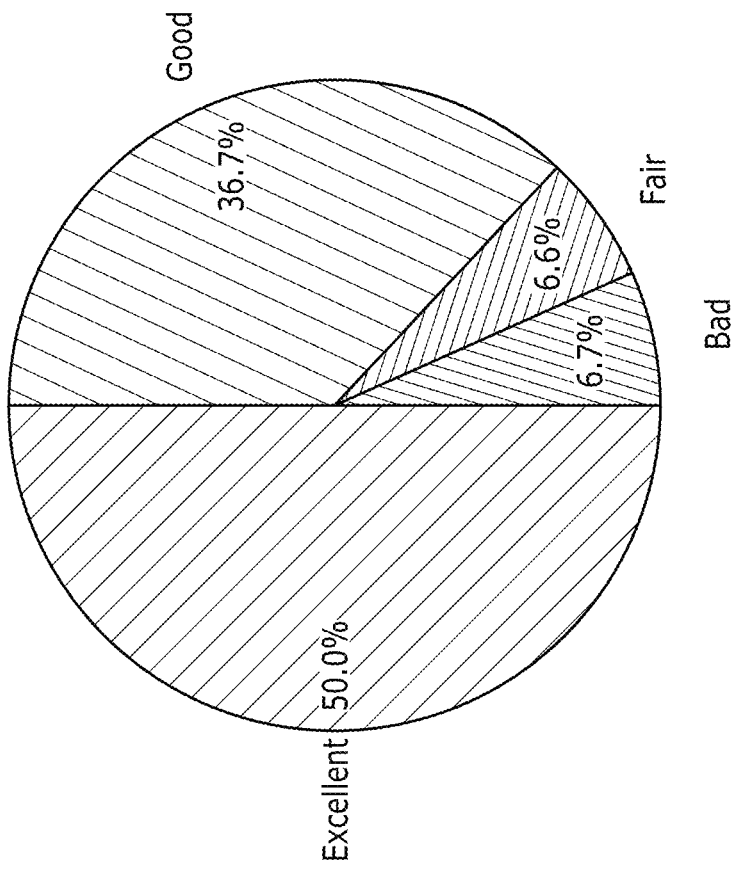
FIG. 4B is an example graph indicating PON network qualities experienced by technical churned customers who have provided negative feedback regarding their PON experience.
Figure 4A:
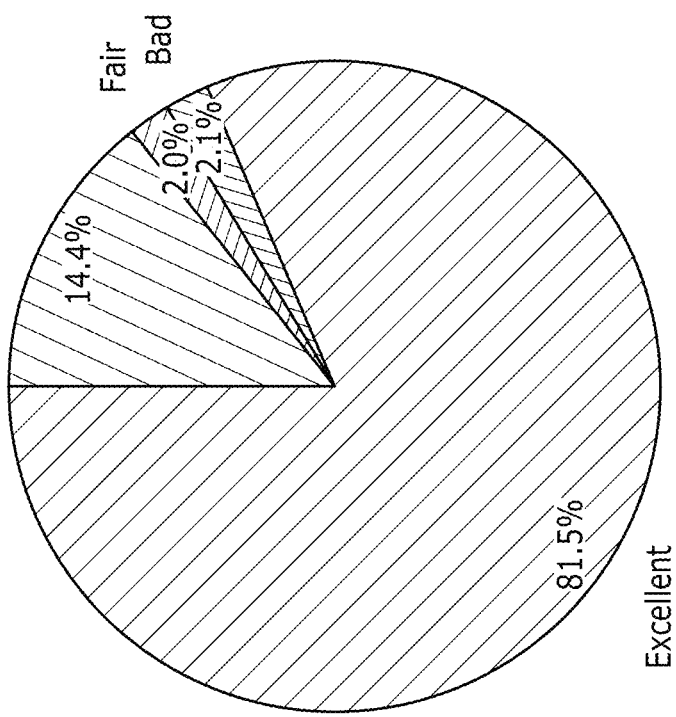
FIG. 4A is an example graph indicating PON network qualities experienced by general customers.

FIG. 4A is an example graph 400A indicating PON network qualities experienced by general customers. The PON network qualities are determined using the network quality evaluation system described above.

FIG. 4B is an example graph 400B indicating PON network qualities experienced by technical churned customers. Technical churned customers are customers who have provided negative feedback regarding their PON experience. The PON network qualities are determined using the network quality evaluation system described above.

As shown by FIGS. 4A and 4B, the network qualities experienced by the technical churned customers, as determined by the network quality evaluation system, are substantially worse than the network qualities experienced by the general customers (including technical churned customers and other customers).

Figures 5A, 5B:
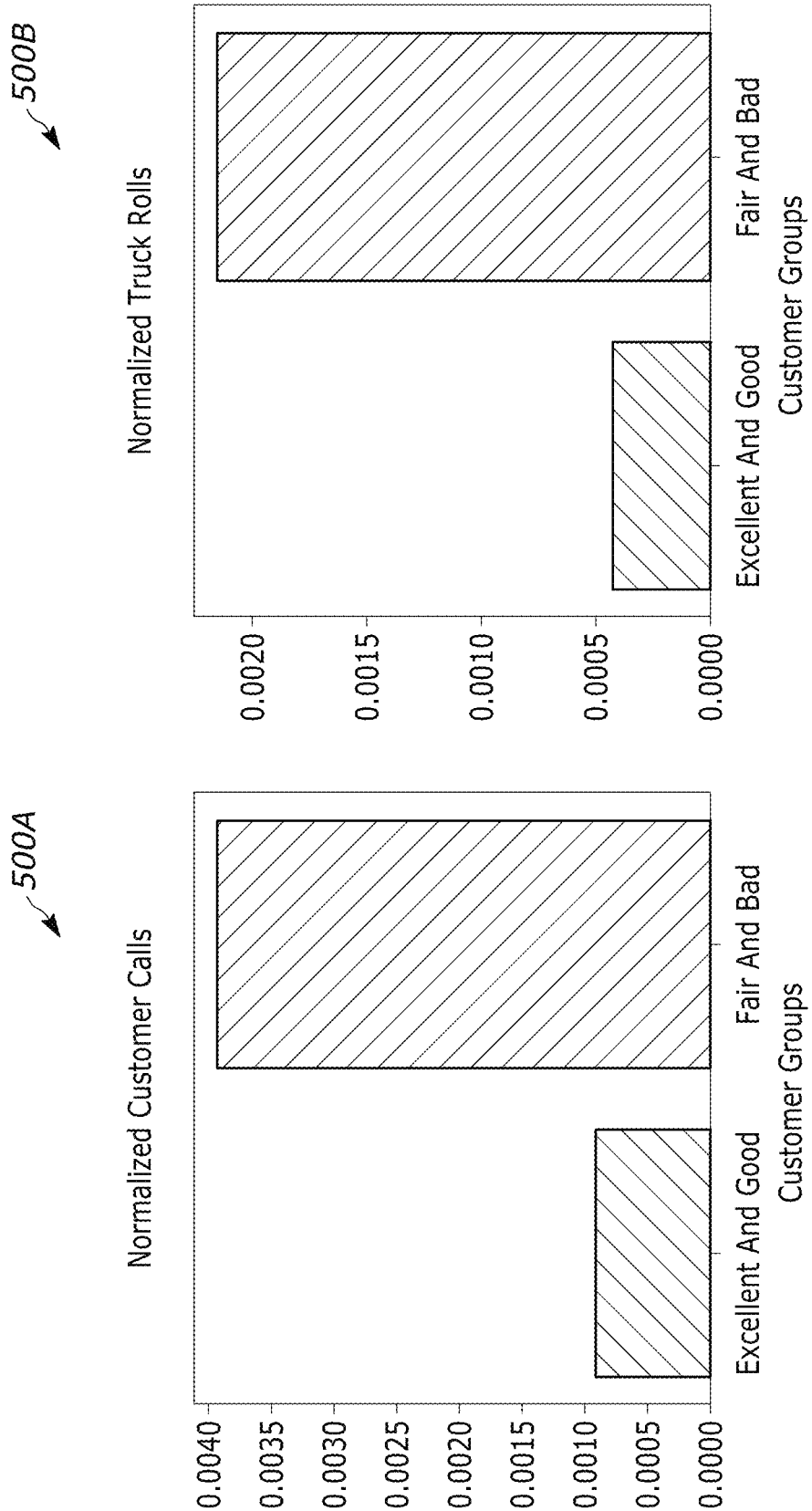
FIG. 5A is an example graph indicating the normalized frequency of customer calls initiated by customers having different PON network quality experiences.
FIG. 5B is an example graph indicating the normalized frequency of truck rolls initiated by customers having different PON network quality experiences.

FIG. 5A is an example graph 500A indicating normalized customer calls initiated by customers having different PON network quality experiences. The PON network qualities are determined using the network quality evaluation system described above.

As shown by FIG. 5A, customers who have initiated customer calls experience substantially more fair or bad network qualities, as determined by the network quality evaluation system, than excellent or good network qualities.

FIG. 5B is an example graph 500B indicating normalized truck rolls initiated by customers having different PON network quality experiences. A truck roll is an on-site service requested to address PON performance issues. The PON network qualities are determined using the network quality evaluation system described above.

As shown by FIG. 5B, customers who have requested truck rolls experience substantially more fair or bad network qualities, as determined by the network quality evaluation system, than excellent or good network qualities.

Accordingly, the graphs of FIGS. 4A-5B confirm that the network qualities determined by the network quality evaluation system correlate with customer feedback.

Example Process

Figure 6:
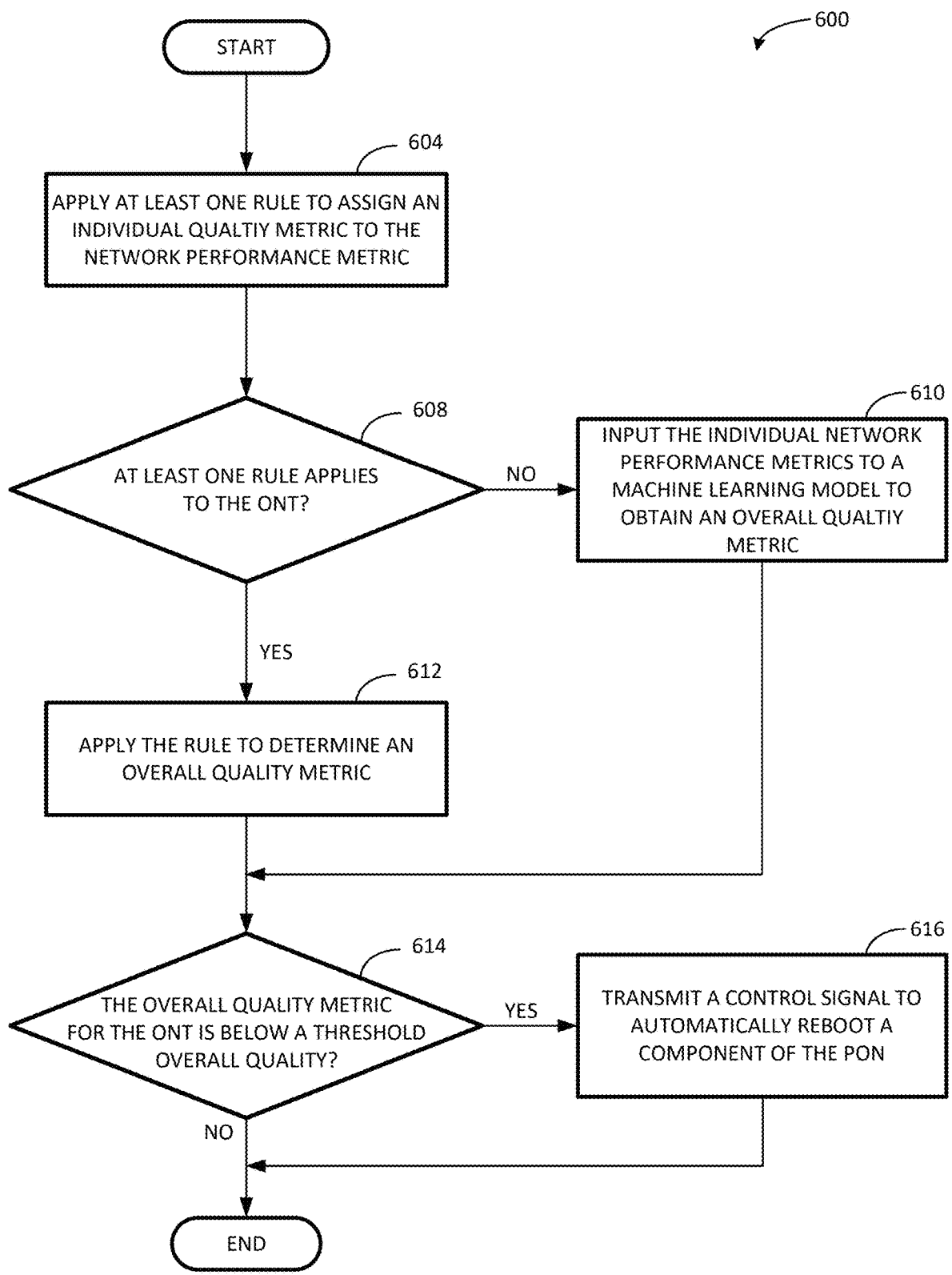
FIG. 6 is a flowchart representative of an example method for evaluating network quality of a PON by applying rules and/or using machine learning models, which may be performed by a computing device of FIG. 1.

FIG. 6 is a flowchart representative of an example method 600 for evaluating network quality of the PON 100 by applying rules and/or using machine learning models. The example method 600 provides details to some aspects of the example method 700 (described below). For convenience, the method 600 is described as being performed by the server 130. One will appreciate that the method 600 may be performed by the server 130, the computing device 125, or any suitable combination of the two.

The method 600 may begin with the server 130 obtaining a plurality of network performance metrics for an optical network terminal (ONT) for a customer in a passive optical network (PON). The network performance metrics may include at least one of a customer light level, an alarm duration, a number of alarms, a session duration, a number of session stops, or a packet discard rate. In some embodiments, the network performance metrics are collected during a certain time period. In some embodiments, the time period is selected by a user (e.g., via the computing device 125).

At block 604, the server 130 applies at least one rule of a plurality of rules to assign an individual quality metric to the network performance metric. For example, as described above, if a customer light level is greater than or equal to −25, the server 130 categorizes the ONT light level as excellent. The plurality of rules are described above with respect to FIGS. 3A-3D and Table 1.

At block 608, the server 130 may determine whether any of the well-defined, fixed rules apply to network performance metrics of an ONT. The rules are described above with respect to Table 2.

If the server 130 determines that one of the rules applies to the network performance metrics, at block 612, the server 130 applies the rule to determine an overall quality metric of the network performance of the ONT. For example, as described above, if a customer light level, an alarm duration, a session duration, a number of stop sessions, and a number of alarms of an ONT are all categorized as excellent, the server 130 may determine that the overall network performance of the ONT is excellent, or assign a quality score 3 indicating that the overall performance is excellent.

Otherwise, if the server 130 determines that none of the rules applies to the network performance metrics, at block 610, the server 130 may input the network performance metric into a machine learning model to obtain an overall quality metric for the network performance metric. For example, as described above, if each of a customer light level, an alarm duration, and a session duration of an ONT is neither excellent nor bad, the server 130 may input the network performance metrics of the ONT into a machine learning model to obtain an overall quality metric, such as good or fair, or a quality score 2 indicating a good quality or a quality score 1 indicating a fair quality.

After determining an overall quality metric of the network performance of the ONT, at block 614, the server 130 may determine whether the overall quality metric is below a threshold overall quality. In some embodiments, the threshold quality metric is fair or a quality score of 1. In other embodiments, the threshold quality metric is good or a quality score of 2.

If the server 130 determines that the overall quality metric is below the threshold quality metric, at block 616, the server 130 may transmit a control signal to automatically reboot a component of the PON associated with the ONT. For example, if the threshold overall quality is good, then a fair quality of an ONT network performance may cause the server 130 to transmit the control signal to reboot the PON.

Figure 7:
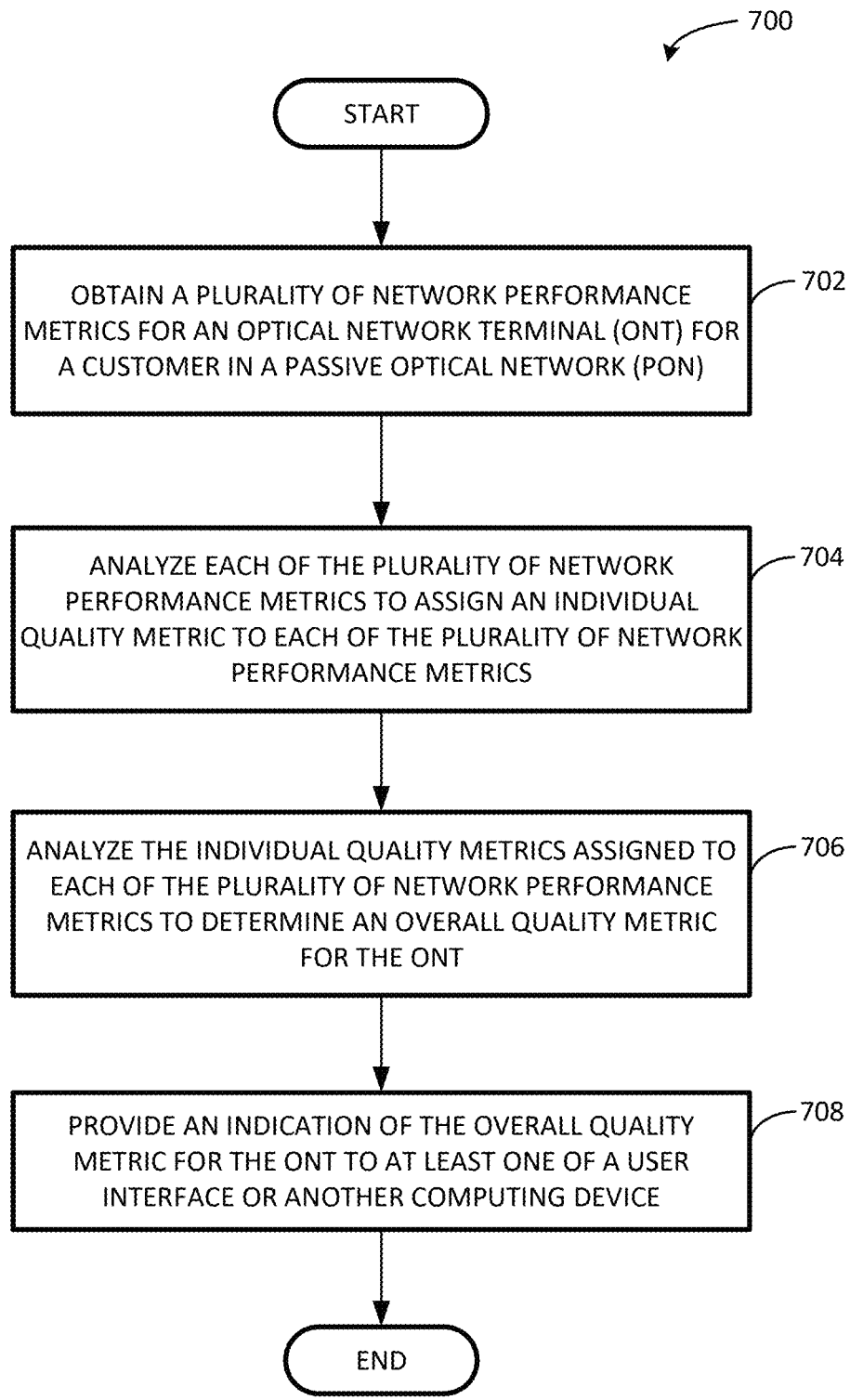
FIG. 7 is a flowchart representative of an example method for evaluating network quality of a PON, which may be performed by a computing device of FIG. 1.

FIG. 7 is a flowchart representative of an example method 700 for evaluating network quality of the PON 100. For convenience, the method 700 is described as being performed by the server 130. One will appreciate that the method 700 may be performed by the server 130, the computing device 125, or any suitable combination of the two.

At block 702, the server 130 may obtain a plurality of network performance metrics for an optical network terminal (ONT) for a customer in a passive optical network (PON). The network performance metrics may include at least one of a customer light level, an alarm duration, a number of alarms, a session duration, a number of session stops, or a packet discard rate.

At block 704, the server 130 may analyze each of the plurality of network performance metrics to assign an individual quality metric to each of the plurality of network performance metrics.

Analyzing each network performance metric may include applying at least one rule, of a plurality of rules for assigning individual quality metrics, to the at least one network performance metric to assign an individual quality metric to the at least one network performance metric, as described with respect to block 604.

The plurality of rules for assigning individual quality metrics may include at least a first rule and a second rule. The first rule provides that an individual quality metric assigned to at least one network performance metric is categorized as excellent if the at least one network performance metric falls within a first range associated with the at least one network performance metric, as described with respect to FIGS. 3A-3D and Table 1. The second rule provides that an individual quality metric assigned to at least one network performance metric is categorized as good or fair if the at least one network performance metric falls within a second range associated with the at least one network performance metric, as described with respect to FIGS. 3A-3D and Table 1.

The plurality of rules for assigning individual quality metrics may further include a third rule. The third rule provides that an individual quality metric assigned to at least one network performance metric is categorized as bad if the at least one network performance metric falls within a third range associated with the at least one network performance metric, as described with respect to FIGS. 3A-3D and Table 1.

At block 706, the server 130 may analyze the individual quality metrics assigned to each of the plurality of network performance metrics to determine an overall quality metric for the ONT.

Determining an overall quality metric for the ONT may include determining whether any of a plurality of rules for determining overall quality metrics applies to the ONT based on the individual quality metrics, as described with respect to block 608. If the server 130 determines that at least one rule of the plurality of rules for determining overall quality metrics applies to the ONT based on the individual quality metrics, the server 130 may apply the at least one rule to the ONT to determine the overall quality metric based on the individual quality metrics, as described with respect to block 612. If the server 130 determines that none of the plurality of rules for determining overall quality metrics applies to the ONT based on the individual quality metrics, the server 130 may input the network performance metrics into a machine learning model to obtain the overall quality metric, as described with respect to block 610. The machine learning model is trained with training sets of network performance metrics labelled with known overall quality metrics.

The plurality of rules may include at least a first rule and a second rule. The first rule provides that the overall quality metric is excellent if each of the individual quality metrics is categorized as excellent, as described with respect to Table 2. The second rule provides that the overall quality metric is bad if at least one of the individual quality metrics is categorized as bad, as described with respect to Table 2.

At block 708, the server 130 may provide an indication of the overall quality metric for the ONT to at least one of a user interface or another computing device. The server 130 may determine whether the overall quality metric for the ONT is below a threshold overall quality, as described with respect to block 614. If the server 130 determines that the overall quality metric for the ONT is below the threshold overall quality, the server 130 may transmit a control signal to automatically reboot a component of the PON in response to determining that the overall quality metric is below the threshold overall quality, as described with respect to block 616.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium," and "machine-readable storage device" are expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skills in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," and "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%.

Further, unless expressly stated to the contrary, "or" refers to an inclusive or and not to an exclusive or. For example, "A, B, or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Moreover, in the foregoing specification and the attached drawings, specific examples have been described. However, one of ordinary skills in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A method for evaluating performance of a Passive Optical Network (PON), the method comprising: obtaining a plurality of network performance metrics for an optical network terminal (ONT) for a customer in the PON, the PON including an optical line terminal (OLT) optically connected to a plurality of optical network terminals (ONTs) via a plurality of optical fibers; analyzing each of the plurality of network performance metrics to assign an individual quality metric to each of the plurality of network performance metrics; analyzing the individual quality metrics assigned to each of the plurality of network performance metrics to determine an overall quality metric for the ONT; and providing an indication of the overall quality metric for the ONT to at least one of a user interface or another computing device.

2. The method of example 1, further comprising: determining that the overall quality metric for the ONT is below a threshold overall quality; and transmitting a control signal to automatically reboot a component of the PON in response to determining that the overall quality metric is below the threshold overall quality.

3. The method of example 1 or example 2, wherein analyzing the individual quality metrics to determine the overall quality metric for the ONT includes: determining that at least one rule of a plurality of rules for determining overall quality metrics applies to the ONT based on the individual quality metrics; and applying the at least one rule to the ONT to determine the overall quality metric based on the individual quality metrics.

4. The method of any of the preceding examples, wherein: the plurality of rules includes at least a first rule and a second rule, wherein the first rule provides that the overall quality metric is excellent if each of the individual quality metrics is categorized as excellent, and the second rule provides that the overall quality metric is bad if at least one of the individual quality metrics is categorized as bad.

5. The method of any of the preceding examples, wherein analyzing the individual quality metrics to determine the overall quality metric for the ONT includes: determining that none of a plurality of rules for determining overall quality metrics applies to the ONT based on the individual quality metrics; and inputting the plurality of network performance metrics into a machine learning model to obtain the overall quality metric.

6. The method of any of the preceding examples, wherein the machine learning model is trained with training sets of network performance metrics labelled with known overall quality metrics.

7. The method of any of the preceding examples, wherein analyzing each of the plurality of network performance metrics includes: applying at least one rule, of a plurality of rules for assigning individual quality metrics, to the at least one network performance metric to assign an individual quality metric to the at least one network performance metric.

8. The method of any of the preceding examples, wherein: the plurality of rules for assigning individual quality metrics includes at least a first rule and a second rule, wherein the first rule provides that an individual quality metric assigned to at least one network performance metric is categorized as excellent if the at least one network performance metric falls within a first range associated with the at least one network performance metric; and the second rule provides that an individual quality metric assigned to at least one network performance metric is categorized as good or fair if the at least one network performance metric falls within a second range associated with the at least one network performance metric.

9. The method of any of the preceding examples, wherein: the plurality of rules for assigning individual quality metrics further includes a third rule, wherein the third rule provides that an individual quality metric assigned to at least one network performance metric is categorized as bad if the at least one network performance metric falls within a third range associated with the at least one network performance metric.

10. The method of any of the preceding examples, wherein the network performance metrics include at least one of a customer light level, an alarm duration, a number of alarms, a session duration, a number of session stops, or a packet discard rate.

11. A computing device for evaluating performance of a Passive Optical Network (PON), the computing device comprising: one or more processors; and a non-transitory computer-readable memory storing instructions thereon that, when executed by the one or more processors, cause the computing device to: obtain a plurality of network performance metrics for an optical network terminal (ONT) for a customer in the PON, the PON including an optical line terminal (OLT) optically connected to a plurality of optical network terminals (ONTs) via a plurality of optical fibers; analyze each of the plurality of network performance metrics to assign an individual quality metric to each of the plurality of network performance metrics; analyze the individual quality metrics assigned to each of the plurality of network performance metrics to determine an overall quality metric for the ONT; and provide an indication of the overall quality metric for the ONT to at least one of a user interface or another computing device.

12. The computing device of example 11, wherein the instructions, when executed by the one or more processors, further cause the computing device to: determine that the overall quality metric for the ONT is below a threshold overall quality; and transmit a control signal to automatically reboot a component of the PON in response to determining that the overall quality metric is below the threshold overall quality.

13. The computing device of example 11 or example 12, wherein to analyze the individual quality metrics to determine the overall quality metric for the ONT, the instructions, when executed by the one or more processors, cause the computing device to: determine that at least one rule of a plurality of rules for determining overall quality metrics applies to the ONT based on the individual quality metrics; and apply the at least one rule to the ONT to determine the overall quality metric based on the individual quality metrics.

14. The computing device of any of examples 11 to 13, wherein: the plurality of rules includes at least a first rule and a second rule, wherein the first rule provides that the overall quality metric is excellent if each of the individual quality metrics is categorized as excellent, and the second rule provides that the overall quality metric is bad if at least one of the individual quality metrics is categorized as bad.

15. The computing device of any of examples 11 to 14, wherein to analyze the individual quality metrics to determine the overall quality metric for the ONT, the instructions, when executed by the one or more processors, cause the computing device to: determine that none of a plurality of rules for determining overall quality metrics applies to the ONT based on the individual quality metrics; and input the plurality of network performance metrics into a machine learning model to obtain the overall quality metric.

16. The computing device of any of examples 11 to 15, wherein the machine learning model is trained with training sets of network performance metrics labelled with known overall quality metrics.

17. The computing device of any of examples 11 to 16, wherein to analyze each of the plurality of network performance metrics, the instructions, when executed by the one or more processors, cause the computing device to: apply the at least one rule, of a plurality of rules for assigning individual quality metrics, to the at least one network performance metric to assign an individual quality metric to the at least one network performance metric.

18. The computing device of any of examples 11 to 17, wherein the plurality of rules for assigning individual quality metrics includes at least a first rule and a second rule, wherein: the first rule provides that an individual quality metric assigned to at least one network performance metric is categorized as excellent if the at least one network performance metric falls within a first range associated with the at least one network performance metric; and the second rule provides that an individual quality metric assigned to at least one network performance metric is categorized as good or fair if the at least one network performance metric falls within a second range associated with the at least one network performance metric.

19. The computing device of any of examples 11 to 18, wherein the plurality of rules for assigning individual quality metrics further includes a third rule, wherein: the third rule provides that an individual quality metric assigned to at least one network performance metric is categorized as bad if the at least one network performance metric falls within a third range associated with the at least one network performance metric.

20. The computing device of any of examples 11 to 19, wherein the network performance metrics include at least one of a customer light level, an alarm duration, a number of alarms, a session duration, a number of session stops, or a packet discard rate.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112 (f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for evaluating performance of a Passive Optical Network (PON), the method comprising:
    obtaining a plurality of network performance metrics for an optical network terminal (ONT) for a customer in the PON, the PON including an optical line terminal (OLT) optically connected to a plurality of optical network terminals (ONTs) via a plurality of optical fibers;
    analyzing each of the plurality of network performance metrics to assign an individual quality metric to each of the plurality of network performance metrics;
    analyzing the individual quality metrics assigned to each of the plurality of network performance metrics to determine an overall quality metric for the ONT, including:
        determining that none of a plurality of rules for determining overall quality metrics applies to the ONT based on the individual quality metrics; and
        inputting the plurality of network performance metrics into a machine learning model to obtain the overall quality metric; and
    providing an indication of the overall quality metric for the ONT to at least one of a user interface or another computing device.

2. The method of claim 1, further comprising:
    determining that the overall quality metric for the ONT is below a threshold overall quality; and
    transmitting a control signal to automatically reboot a component of the PON in response to determining that the overall quality metric is below the threshold overall quality.

3. The method of claim 1, wherein the machine learning model is trained with training sets of network performance metrics labelled with known overall quality metrics.

4. The method of claim 1, wherein analyzing each of the plurality of network performance metrics includes:
    applying at least one rule, of a plurality of rules for assigning individual quality metrics, to at least one of the network performance metrics to assign an individual quality metric to the at least one of the network performance metrics.

5. The method of claim 4, wherein:
    the plurality of rules for assigning individual quality metrics includes at least a first rule and a second rule, wherein:
        the first rule provides that an individual quality metric assigned to at least one of the network performance metrics is categorized as excellent if the at least one of the network performance metrics falls within a first range associated with the at least one of the network performance metrics; and
        the second rule provides that an individual quality metric assigned to at least one of the network performance metrics is categorized as good or fair if the at least one of the network performance metrics falls within a second range associated with the at least one of the network performance metrics.

6. The method of claim 5, wherein:
    the plurality of rules for assigning individual quality metrics further includes a third rule, wherein:
        the third rule provides that an individual quality metric assigned to at least one of the network performance metrics is categorized as bad if the at least one of the network performance metrics falls within a third range associated with the at least one of the network performance metrics.

7. The method of claim 1, wherein the network performance metrics include at least one of a customer light level, an alarm duration, a number of alarms, a session duration, a number of session stops, or a packet discard rate.

8. A computing device for evaluating performance of a Passive Optical Network (PON), the computing device comprising:
    one or more processors; and
    a non-transitory computer-readable memory storing instructions thereon that, when executed by the one or more processors, cause the computing device to:
        obtain a plurality of network performance metrics for an optical network terminal (ONT) for a customer in the PON, the PON including an optical line terminal (OLT) optically connected to a plurality of optical network terminals (ONTs) via a plurality of optical fibers;

analyze each of the plurality of network performance metrics to assign an individual quality metric to each of the plurality of network performance metrics;

analyze the individual quality metrics assigned to each of the plurality of network performance metrics to determine an overall quality metric for the ONT, including:

determining whether at least one of a plurality of rules for determining overall quality metrics applies to the ONT based on the individual quality metrics; and when none of the plurality of rules for determining overall quality metrics applies to the ONT based on the individual quality metrics; and, inputting the plurality of network performance metrics into a machine learning model to obtain the overall quality metric; and provide an indication of the overall quality metric for the ONT to at least one of a user interface or another computing device.

9. The computing device of claim 8, wherein the instructions, when executed by the one or more processors, further cause the computing device to:

determine that the overall quality metric for the ONT is below a threshold overall quality; and transmit a control signal to automatically reboot a component of the PON in response to determining that the overall quality metric is below the threshold overall quality.

10. The computing device of claim 8, wherein to analyze the individual quality metrics to determine the overall quality metric for the ONT, the instructions, when executed by the one or more processors, cause the computing device to:

when at least one rule of the plurality of rules for determining overall quality metrics applies to the ONT based on the individual quality metrics, apply the at least one rule to the ONT to determine the overall quality metric based on the individual quality metrics.

11. The computing device of claim 10, wherein:

the plurality of rules includes at least a first rule and a second rule, wherein:

the first rule provides that the overall quality metric is excellent if each of the individual quality metrics is categorized as excellent, and the second rule provides that the overall quality metric is bad if at least one of the individual quality metrics is categorized as bad.

12. The computing device of claim 8, wherein the machine learning model is trained with training sets of network performance metrics labelled with known overall quality metrics.

13. The computing device of claim 8, wherein to analyze each of the plurality of network performance metrics, the instructions, when executed by the one or more processors, cause the computing device to:

apply at least one rule, of a plurality of rules for assigning individual quality metrics, to at least one of the network performance metrics to assign an individual quality metric to the at least one of the network performance metrics.

14. The computing device of claim 13, wherein:

the plurality of rules for assigning individual quality metrics includes at least a first rule and a second rule, wherein:

the first rule provides that an individual quality metric assigned to at least one of the network performance metrics is categorized as excellent if the at least one of the network performance metrics falls within a first range associated with the at least one of the network performance metrics; and the second rule provides that an individual quality metric assigned to at least one of the network performance metrics is categorized as good or fair if the at least one of the network performance metrics falls within a second range associated with the at least one of the network performance metrics.

15. The computing device of claim 14, wherein:

the plurality of rules for assigning individual quality metrics further includes a third rule, wherein:

the third rule provides that an individual quality metric assigned to at least one of the network performance metrics is categorized as bad if the at least one of the network performance metrics falls within a third range associated with the at least one of the network performance metrics.

16. The computing device of claim 8, wherein the network performance metrics include at least one of a customer light level, an alarm duration, a number of alarms, a session duration, a number of session stops, or a packet discard rate.

* * * * *